(12) United States Patent
Howard et al.

(10) Patent No.: US 7,900,452 B2
(45) Date of Patent: Mar. 8, 2011

(54) CLATHRATE ICE THERMAL TRANSPORT FOR OCEAN THERMAL ENERGY CONVERSION

(75) Inventors: Robert J. Howard, Clifton, VA (US);
John W. Rapp, Manassas, VA (US);
Patrick Grandelli, Kailua, HI (US);
Joseph C. Van Ryzin, Kailua, HI (US)

(73) Assignee: Lockheed Martin Corporation, Bethesda, MD (US)

( * ) Notice: Subject to any disclaimer, the term of this patent is extended or adjusted under 35 U.S.C. 154(b) by 203 days.

(21) Appl. No.: 12/142,231

(22) Filed: Jun. 19, 2008

(65) Prior Publication Data

US 2008/0314043 A1 Dec. 25, 2008

Related U.S. Application Data

(60) Provisional application No. 60/936,270, filed on Jun. 19, 2007.

(51) Int. Cl.
*F03G 7/04* (2006.01)

(52) U.S. Cl. ........................................ 60/641.7
(58) Field of Classification Search ............... 60/641.6, 60/641.7
See application file for complete search history.

(56) References Cited

U.S. PATENT DOCUMENTS

| 4,104,883 A | 8/1978 | Naef |
| 4,110,628 A * | 8/1978 | Paull et al. ............... 290/1 R |
| 4,373,339 A * | 2/1983 | Sorensen .................... 60/649 |
| 4,726,191 A * | 2/1988 | Kawamura ............... 60/641.7 |
| 7,493,763 B2 * | 2/2009 | Klochko et al. ........... 60/641.7 |

* cited by examiner

*Primary Examiner* — Hoang M Nguyen
(74) *Attorney, Agent, or Firm* — Schwegman, Lundberg & Woessner, P.A.

(57) ABSTRACT

A substance is added to cold ocean water in a cold water pipe of an Ocean Thermal Energy Conversion (OTEC) system. The substance raises the freezing point of the ocean water in a cold water heat exchanger of the OTEC system, thereby forming an ice slurry. The substance is added at the depth of the apparatus. The ice slurry is transported from the point of addition in the cold water pipe to the cold water heat exchanger at the surface.

20 Claims, 4 Drawing Sheets

CLATHRATE ICE THERMAL TRANSPORT FOR OCEAN THERMAL ENERGY CONVERSION

RELATED APPLICATION

This application claims the benefit of the filing date of U.S. Provisional Patent Application Ser. No. 60/936,270 filed Jun. 19, 2007, which application is incorporated herein in its entirety.

TECHNICAL FIELD

The present disclosure relates to Ocean Thermal Energy Conversion (OTEC) systems, and in an embodiment, but not by way of limitation, to OTEC systems in which a clathrating agent or other substance is added to the water in a cold water heat exchanger to raise the freezing point of that water above the cold ocean water temperature.

BACKGROUND

An Ocean Thermal Energy Conversion (OTEC) system utilizes the differential between the relatively warm upper surfaces of the ocean in the waters around the earth's equator and the colder waters at depths of around 1,000 meters. In a closed OTEC system, a working fluid of relatively low boiling point, such as ammonia, is vaporized in a first heat exchanger section of the system by the warm ocean water. That vaporized working fluid turns a turbine to generate electricity, and the working fluid vapor is then condensed in a second heat exchanger section using the colder ocean water that is pumped from the depth of around 1,000 meters.

A problem with current OTEC systems is that they are not very efficient, and much of the electrical energy produced by the system is needed to run the pumps that pump the cold ocean water up to the heat exchanger that condenses the working fluid.

SUMMARY

Figure 1:
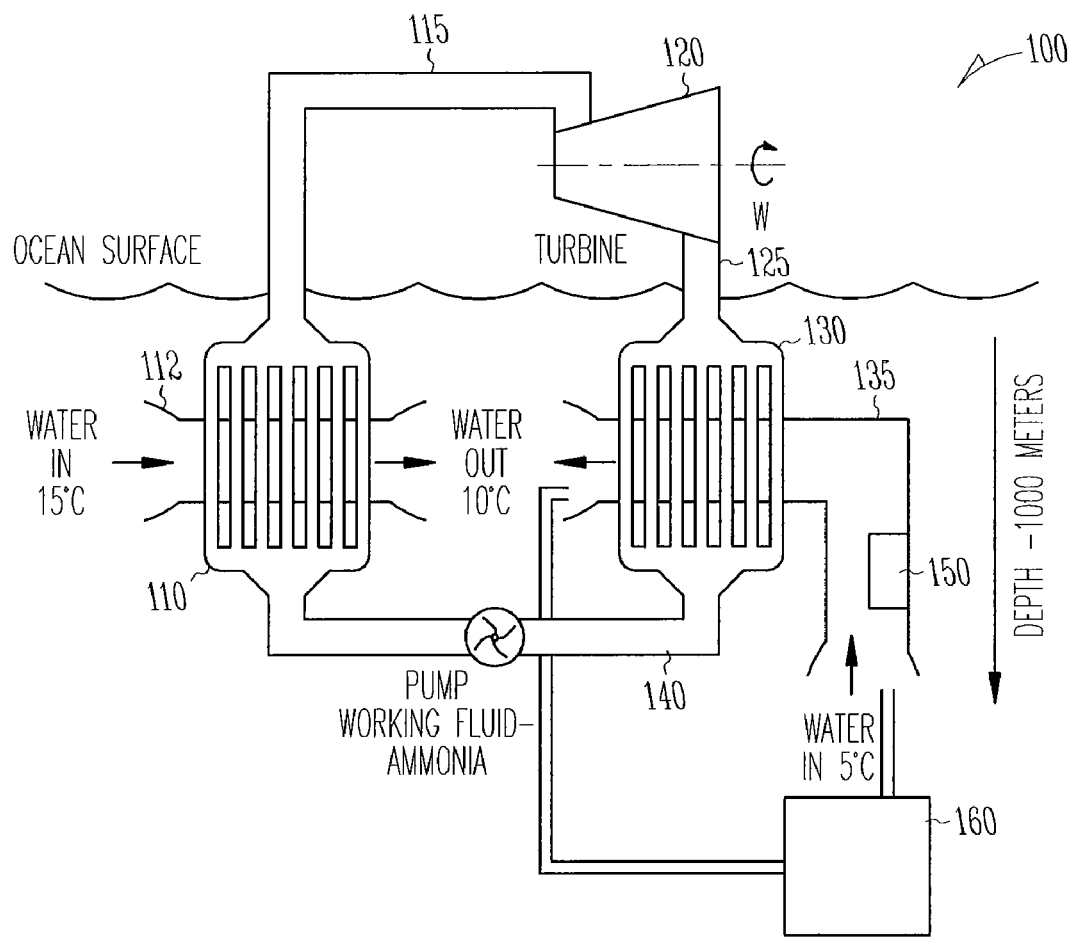
FIG. 1 is a diagram of an Ocean Thermal Energy Conversion (OTEC) system with a clathrating agent (or other substance to raise the freezing point of the cold ocean water) injection system.

A substance is added to cold ocean water in a cold water pipe of an Ocean Thermal Energy Conversion (OTEC) system. The substance raises the freezing point of the ocean water in a cold water heat exchanger of the OTEC system, thereby forming an ice slurry. The substance is added at the depth of the apparatus. The ice slurry is transported from the point of addition in the cold water pipe to the cold water heat exchanger at the surface.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Embodiments of the present invention address the shortcomings of Ocean Thermal Energy Conversion (OTEC) systems by invoking a phase change in the ocean water in a cold water heat exchanger at depth in an OTEC system. In an embodiment, the phase change includes replacing the ocean water as the thermal transport medium with an ice slurry, thereby storing energy in the cold ocean water via the latent heat of fusion. Consequently, a decreased amount of heat transport fluid is needed to condense the working fluid in the cold heat exchanger of the OTEC system, resulting in less energy being expended to pump that cold water or ice slurry to the surface. Also, because the ice slurry is less dense than the separated water and clathrating agent, a reduced amount of pumping energy is needed to transport the ice slurry from the depths of the ocean to the surface. The less dense ice slurry also causes the ice slurry to naturally rise in the cold water pipe of the OTEC system and create a natural convective flow of the ice slurry to the surface. Furthermore, because ice expands as it freezes, lowering the pressure of the slurry is known to cause the slurry temperature to decrease. This effect can be exploited for the different clathrates to improve the thermodynamic efficiency of the turbine, or to improve the heat transfer.

FIG. 1 illustrates an example embodiment of an OTEC system 100. While FIG. 1 depicts an open OTEC system for ease of illustration purposes, in practice, a closed OTEC system in which a clathrating agent is recovered would be desired for both economic and environmental reasons. The system 100 includes a first heat exchanger 110 in which warm ocean water causes the working fluid to vaporize. The warm ocean water is fed through the first heat exchanger 110 via a pipe or other conduit 112. The vaporized working fluid travels through a pipe 115, and into a turbine 120. The working fluid exits the turbine 120 into a pipe 125, and then into a second heat exchanger 130. Cold water is pumped up from depths of approximately 1,000 meters via cold water pipe 135 and run through the second heat exchanger 130 to condense the working fluid. The working fluid then travels through pipe 140, reenters the first heat exchanger 110, and begins the cycle again. FIG. 1 further indicates that the working fluid can be ammonia.

In an embodiment, a clathrating agent such as R141B, methane, ethane, and/or propane, or other substance that can raise the freezing point of the cold ocean water, is added to the cold water in a heat exchanger 160 at the depths of the cold water pipe. Either gaseous or liquid clathrating agents may be used, and the propane or ethane may be pressurized to liquefy the propane or ethane before it is transported to depth. The addition of the clathrating agent to the cold ocean water raises the freezing point of the water to above the temperature of the cold ocean water. This transforms the cold water (cooled to the temperature of the cold ocean water) into an ice slurry, and the ice slurry is pumped up to the second heat exchanger 130. Since the ice slurry, because of the latent heat of fusion, requires more energy to heat than cold ocean water, it will absorb more heat from the working fluid, and a smaller mass of the ice slurry is needed than if just cold ocean water is used. As a result a smaller cold water pipe 135 and a smaller pump may be used. An antifreeze can be used in conjunction with the clathrating agent to adjust the freezing point of the cold ocean water, and an emulsifying agent can be used to keep the clathrating agent suspended in the water.

Figure 2:
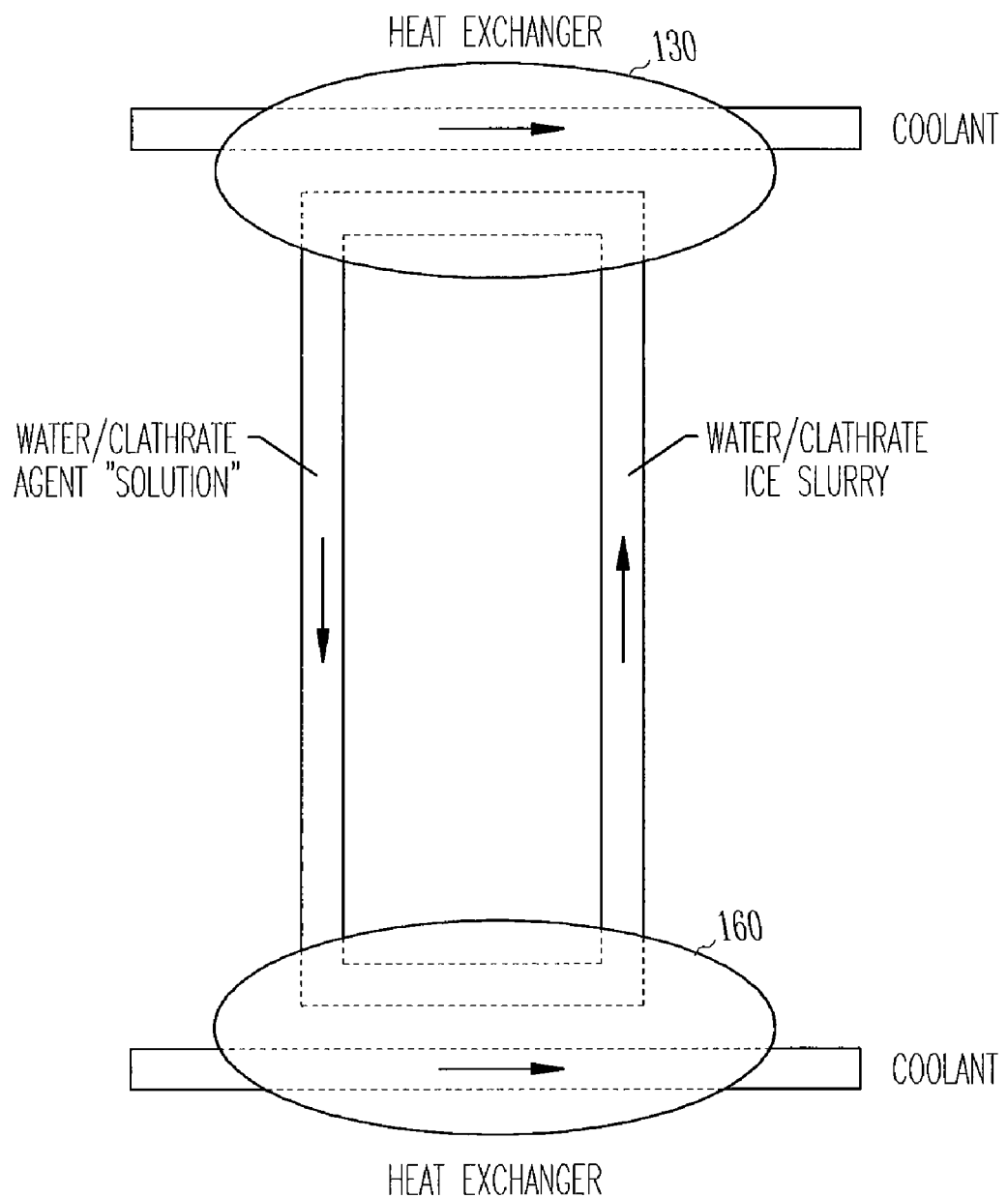
FIG. 2 illustrates an embodiment of a cold water heat exchanger at the surface and a cold water heat exchanger at depth in an OTEC system.

FIG. 2 illustrates a block diagram of the cold water heat exchanger 130 at surface and the cold water heat exchanger at depth 160 of FIG. 1. As shown in FIG. 2, a clathrating agent or solution is added at depth prior to the heat exchanger 160, and the clathrate ice slurry is transported to the cold heat exchanger 130 at the surface. In this embodiment, it is assumed that the clathrating agent either remains suspended as an emulsion or separates as a liquid.

Figure 3:
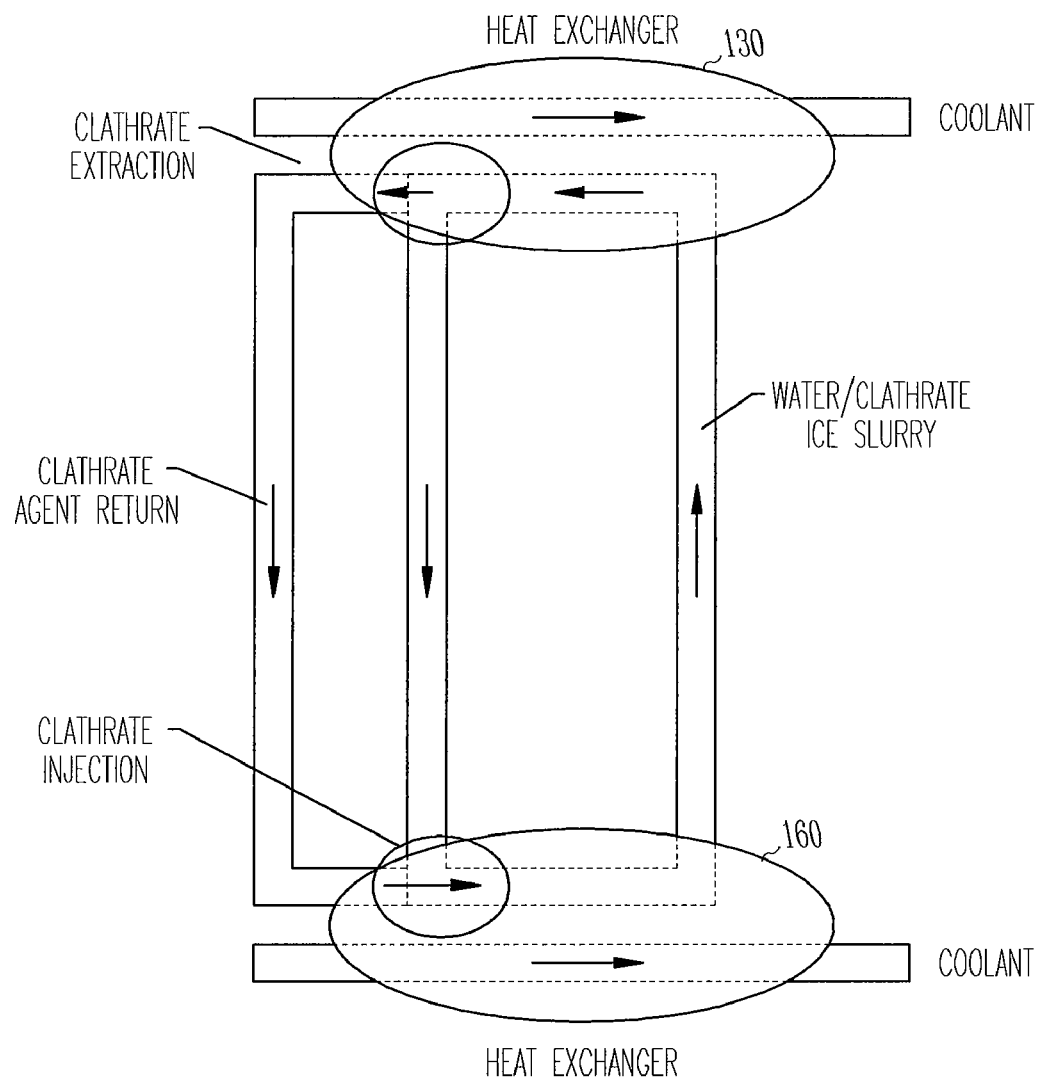
FIG. 3 illustrates another embodiment of a cold water heat exchanger at the surface and a cold water heat exchanger at depth in an OTEC system.

FIG. 3 illustrates a block diagram of another embodiment of the cold water heat exchanger 130 at surface and the cold water heat exchanger 160 at depth of FIG. 1. In this embodiment, the clathrating agent is extracted after leaving the cold water heat exchanger 130, and then it is re-injected into the system prior to entering the cold water heat exchanger 160 at depth. This embodiment assumes that the clathrating agent separates as a gas or as an immiscible liquid.

In an embodiment, a 10 to 20 per cent clathrating agent may be used. In another embodiment, a liquid clathrating agent emulsion is used.

As alluded to above, the clathrate OTEC system can provide several advantages. The clathrate ice slurry is less dense than the cold ocean water used in the cold water pipe of prior OTEC systems. This results in two advantages. First, the less dense clathrate solution will rise under natural convection. Even if pumping is required, less energy will be needed because of the less dense clathrate solution. Second, the clathrate ice slurry has a higher heat capacity than water. Therefore, a smaller amount of ice slurry can be used as compared to the amount of cold ocean water that would be needed, and a smaller cold water pipe can be used. The ice slurry also has the advantage of scraping the boundary layer of the heat exchanger. This results in better heat transfer through thinning of the boundary layer.

The freezing point of the clathrate slurry is adjustable using any number of tertiary systems. For example, a feedback system using a sensor 150 can detect the concentration of ionic salts or anti-freeze (polypropylene, methanol, and ethanol) in the water, and the concentration of these salts or anti-freeze can then be adjusted accordingly. In another example, the sensor 150 could measure the density of the heat transfer fluid, which could then be used to determine the relative fraction of clathrate ice in the slurry.

Figure 4:
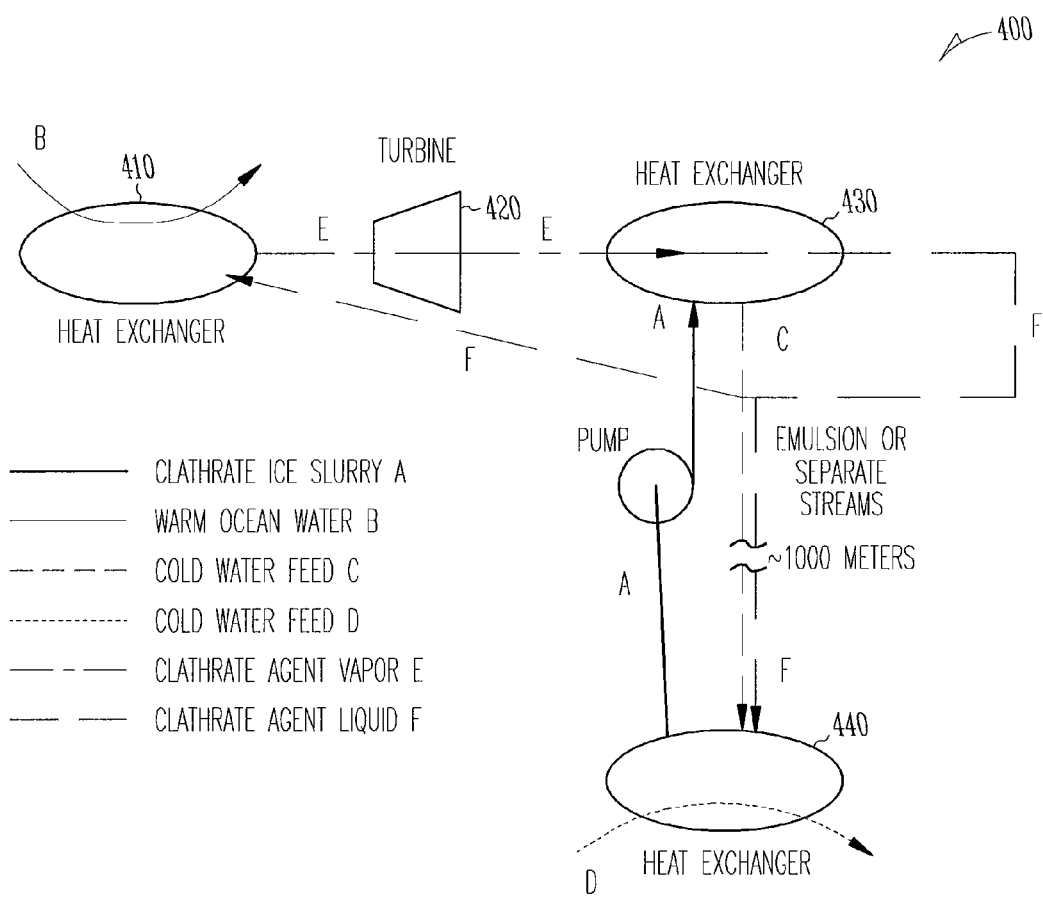
FIG. 4 illustrates another example embodiment of an Ocean Thermal Energy Conversion (OTEC) system with a clathrating agent injection system.

FIG. 4 illustrates another example embodiment of an OTEC system 400 that includes a means for using a clathrating agent as the working fluid. The system 400 includes a hot side heat exchanger 410 at the surface, a turbine 420, a cold side heat exchanger 430 at the surface, and a heat exchanger 440 at depth. Like in the embodiment of FIGS. 1, 2, and 3, the depth of heat exchanger 440 is approximately 1,000 meters. A clathrating agent is added to the working fluid, and pumped down to the heat exchanger 440 at depth, thereby raising the freezing point of the working fluid, and forming a clathrate ice slurry. The ice slurry is pumped up to the cold side heat exchanger 430 at the surface, and the ice slurry is used to condense the working fluid that exits the turbine 420.

In addition to pumping the clathrate and working fluid solution down to depth, the working fluid containing the clathrate is transported through the hot side heat exchanger 410, wherein the warm ocean water causes the working fluid to evaporate. The resulting pressure causes the turbine to turn. Upon exiting the turbine 420, the working fluid with the clathrating agent is condensed by the working fluid and clathrating agent ice slurry that is pumped from depth. In an embodiment, the cold side heat exchanger 430 does not include separate tubes or compartments for the working fluid coming from the turbine 420 and the ice slurry that is pumped from depth. Rather, since the working fluid and clathrating agent from the turbine and the working fluid and clathrating agent from depth (i.e., the ice slurry) are virtually one and the same, the two can be directly mixed to cause the condensation of the working fluid exiting the turbine 420. Therefore, the cold side heat exchanger can be a much simpler unit, and the direct contact between the two fluids results in a reduced ΔT. The other advantages of a clathrate induced ice slurry as discussed in connection with the embodiments of FIGS. 1, 2, and 3 also are applicable to the embodiment of FIG. 4.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A process comprising:
   adding a substance to cold ocean water in a cold water pipe of an Ocean Thermal Energy Conversion (OTEC) system, the substance for raising the freezing point of the ocean water in the OTEC system, the substance added at the depth of the apparatus, thereby forming an ice slurry; and
   transporting the ice slurry from the point of addition in the cold water pipe to a cold water heat exchanger at surface; wherein the latent heat of fusion of the ice slurry aids in condensing a vaporized working fluid in the OTEC system.

2. The process of claim 1, wherein the substance comprises a clathrating agent.

3. The process of claim 2, wherein the clathrating agent comprises one or more of R141B, methane, ethane, and propane hydrate.

4. The process of claim 1, wherein the depth is equal to approximately 1,000 meters.

5. The process of claim 1, wherein the substance is added in a cold water heat exchanger at a depth of approximately 1,000 meters.

6. The process of claim 1, comprising adding an antifreeze to the cold ocean water in the cold water pipe.

7. The process of claim 1, comprising adding an emulsifying agent to the cold ocean water in the cold water pipe.

8. An ocean thermal energy conversion (OTEC) apparatus comprising:
    a turbine;
    a hot heat exchanger coupled to the turbine;
    a cold heat exchanger at surface coupled to the turbine;
    a cold water pipe, coupled to the cold heat exchanger, the cold water pipe including an at depth cold heat exchanger, and the cold water pipe for feeding cold ocean water to the cold heat exchanger at surface; and
    an injection point at a depth of the cold water pipe, the injection point for injecting a substance into the cold water pipe to raise the freezing point of the cold ocean water, thereby forming an ice slurry, and for transporting the ice slurry to one or more of the cold heat exchanger at surface and the at depth cold heat exchanger;
    wherein the latent heat of fusion of the ice slurry aids in condensing a vaporized working fluid in the OTEC system.

9. The OTEC apparatus of claim 8, wherein the substance comprises a clathrating agent.

10. The OTEC apparatus of claim 9, wherein the clathrating agent comprises one or more of R141B, methane, ethane, and propane hydrate.

11. The OTEC apparatus of claim 8, wherein the depth of the injection point is approximately 1,000 meters.

12. A process comprising:
    adding a substance to a working fluid in a cold water pipe of an Ocean Thermal Energy Conversion (OTEC) system, the substance for raising the freezing point of the working fluid in the OTEC system;
    transporting the working fluid and substance to a heat exchanger at depth, thereby causing the working fluid to form an ice slurry;
    transporting a second portion of the working fluid and substance to a hot side heat exchanger at surface and then through a turbine; and
    transporting the ice slurry from depth to a cold side heat exchanger at the surface to condense the working fluid exiting the turbine.

13. The process of claim 12, wherein the working fluid exiting the turbine and the ice slurry from depth come into direct contact.

14. The process of claim 12, comprising adding an antifreeze to the working fluid.

15. The process of claim 12, comprising adding an emulsifying agent to the working fluid.

16. The process of claim 12, wherein the substance comprises a clathrating agent.

17. The process of claim 16, wherein the clathrating agent comprises one or more of R141B, methane, ethane, and propane hydrate.

18. An ocean thermal energy conversion (OTEC) apparatus comprising:
    a turbine;
    a hot heat exchanger coupled to the turbine;
    a cold heat exchanger coupled to the turbine;
    a cold water pipe, coupled to the cold heat exchanger, the cold water pipe including an at depth cold heat exchanger;
    a working fluid for circulation through the turbine, the cold heat exchanger, the at depth cold heat exchanger, and the hot heat exchanger; and
    an injection point for injecting a substance into the apparatus to raise the freezing point of the working fluid, thereby forming an ice slurry, and for transporting the ice slurry to one or more of the cold heat exchanger and the at depth cold heat exchanger;
    wherein the latent heat of fusion of the ice slurry aids in condensing a vaporized working fluid in the OTEC system.

19. The OTEC apparatus of claim 18, wherein the cold heat exchanger is configured to permit direct contact between the working fluid exiting the turbine and the working fluid from the cold heat exchanger at depth.

20. The OTEC apparatus of claim 18, wherein the injecting a substance into the apparatus causes the formation of an ice slurry fluid exiting the turbine and the working fluid from the cold heat exchanger at depth.

\* \* \* \* \*